United States Patent
Xiang et al.

(10) Patent No.: US 11,095,208 B2
(45) Date of Patent: Aug. 17, 2021

(54) CONTROL METHOD, APPARATUS, DEVICE, AND MEDIUM FOR POWER FACTOR CORRECTION PFC CIRCUIT

(71) Applicant: Vertiv Corporation, Columbus, OH (US)

(72) Inventors: Bo Xiang, Shenzhen (CN); Jian Li, Shenzhen (CN); Ruiguo Yang, Shenzhen (CN); Huaxing Fu, Shenzhen (CN)

(73) Assignee: Vertiv Corporation, Columbus, OH (US)

( * ) Notice: Subject to any disclaimer, the term of this patent is extended or adjusted under 35 U.S.C. 154(b) by 0 days.

(21) Appl. No.: 16/488,535

(22) PCT Filed: Feb. 28, 2019

(86) PCT No.: PCT/CN2019/076451
§ 371 (c)(1),
(2) Date: Aug. 23, 2019

(87) PCT Pub. No.: WO2019/129311
PCT Pub. Date: Jul. 4, 2019

(65) Prior Publication Data
US 2020/0007031 A1    Jan. 2, 2020

(30) Foreign Application Priority Data

Dec. 29, 2017 (CN) .......................... 201711489322.7
Sep. 7, 2018 (CN) .......................... 201811046050.8
Oct. 17, 2018 (CN) .......................... 201811209229.0

(51) Int. Cl.
*H02M 1/42* (2007.01)
*H02M 7/217* (2006.01)
*H02M 7/219* (2006.01)

(52) U.S. Cl.
CPC .......... *H02M 1/4233* (2013.01); *H02M 7/217* (2013.01); *H02M 7/219* (2013.01)

(58) Field of Classification Search
CPC .... H02M 1/42; H02M 1/4208; H02M 1/4225; H02M 1/4233; H02M 1/4241;
(Continued)

(56) References Cited

U.S. PATENT DOCUMENTS 8,730,698 B2    5/2014  Duerbaum et al.
9,735,661 B2    8/2017  Halim et al.
(Continued)

FOREIGN PATENT DOCUMENTS

CN    101860194 A    10/2010
CN    102118107 A    7/2011
(Continued)

OTHER PUBLICATIONS

International Search Report (in English and Chinese) and Written Opinion (in Chinese) issued in PCT/CN2019/076451, dated Apr. 15, 2019; ISA/CN.

(Continued)

*Primary Examiner* — Yemane Mehari

(57) ABSTRACT

Disclosed in embodiments of the present invention are a control method, apparatus, device, and medium for a power factor correction (PFC) circuit, used for solving the problems of high implementation costs and relatively severe THD that exist in existing PFC circuit control methods. The control method for a power factor correction (PFC) circuit, comprising: acquiring circuit parameter information of the PFC circuit; when determining that the circuit parameter information meets a preset switching condition, switching a control mode of the PFC circuit to be a continuous conduction mode (CCM).

12 Claims, 2 Drawing Sheets

(58) Field of Classification Search
CPC .............. H02M 7/217; H02M 7/219; H02M 2001/0009; G05F 1/70; Y02B 70/126; Y02P 80/112
USPC .......................................... 323/205, 210, 235
See application file for complete search history.

(56) References Cited

U.S. PATENT DOCUMENTS

| | | | | |
|---|---|---|---|---|
| 10,439,489 B1* | 10/2019 | Tsai | ................. | H02M 1/4225 |
| 2011/0261599 A1 | 10/2011 | Duerbaum et al. | | |
| 2012/0014148 A1* | 1/2012 | Li | ................. | H02M 1/4216 |
| | | | | 363/78 |
| 2014/0077770 A1* | 3/2014 | Omoto | ................. | H02M 1/4225 |
| | | | | 320/140 |
| 2014/0097808 A1* | 4/2014 | Clark | ................. | G05F 1/70 |
| | | | | 323/208 |
| 2015/0002109 A1 | 1/2015 | Bianco | | |
| 2015/0048807 A1* | 2/2015 | Fan | ................. | H02M 1/42 |
| | | | | 323/208 |
| 2016/0056702 A1* | 2/2016 | Halim | ................. | H02M 7/04 |
| | | | | 363/74 |
| 2016/0241132 A1* | 8/2016 | Lin | ................. | H02M 1/4225 |
| 2016/0336870 A1* | 11/2016 | Halim | ................. | H02M 1/4225 |
| 2018/0062504 A1* | 3/2018 | Mei | ................. | G05F 1/70 |

FOREIGN PATENT DOCUMENTS

| | | |
|---|---|---|
| CN | 104779785 A | 7/2015 |
| CN | 105071650 A | 11/2015 |
| CN | 105391295 A | 3/2016 |
| CN | 107196499 A | 9/2017 |

OTHER PUBLICATIONS

Second Chinese Office Action regarding Application No. 201811209229.0 dated Feb. 5, 2021. English translation provided by Unitalen Attorneys at Law.

* cited by examiner

CONTROL METHOD, APPARATUS, DEVICE, AND MEDIUM FOR POWER FACTOR CORRECTION PFC CIRCUIT

CROSS-REFERENCE TO RELATED APPLICATIONS

The present application is a 371 U.S. National Phase of International Application No. PCT/CN2019/076451, filed on Feb. 28, 2019, which claims priorities to Chinese Patent Application No. 201711489322.7, titled "METHOD AND APPARATUS FOR CONTROLLING POWER FACTOR CORRECTION CIRCUIT", filed on Dec. 29, 2017 with the Chinese Patent Office, Chinese Patent Application No. 201811046050.8, titled "METHOD, APPARATUS AND DEVICE FOR CONTROLLING POWER FACTOR CORRECTION CIRCUIT, AND MEDIUM", filed on Sep. 7, 2018 with the Chinese Patent Office, and Chinese Patent Application No. 201811209229.0, titled "METHOD, APPARATUS AND DEVICE FOR CONTROLLING POWER FACTOR CORRECTION CIRCUIT, AND MEDIUM", filed on Oct. 17, 2018 with the Chinese Patent Office, all of which are incorporated herein by reference in their entireties.

FIELD

The present disclosure relates to the field of control technologies, and in particular to a method, an apparatus and a device for controlling a power factor correction (PFC) circuit, and a medium.

BACKGROUND

In order to ensure high efficiency of a power factor correction (PFC) circuit (specifically, a totem-pole PFC circuit), the PFC circuit generally operates in a critical-conduction mode (CRM) or a triangular current mode (TCM). However, in this case, if an output voltage of the PFC circuit is approximate to an input voltage of the PFC circuit, a current flowing through an inductor in the PFC circuit may be not reduced to be zero or may be reduced to be zero (or a fixed negative value) after a long time period elapses, so that a next period cannot be normally started in the PFC circuit, which may result in instability of the PFC circuit and may even affect the normal operation of the PFC circuit.

Currently, the following two methods are generally adopted to solve the above problems.

In a first method, a voltage-withstand level of a bus capacitor in the PFC circuit is improved, so that a voltage difference between the output voltage and the input voltage of the PFC circuit is increased. However, after the voltage-withstand level of the bus capacitor is improved, a capacity of a capacitor is greatly reduced under a same volume, which may result in a decrease in power density or other electrical performances, and also may result in a high cost.

In a second method, a given current peak value (or an on-time period Ton) of the inductor in the PFC circuit is reduced, so that the current flowing through the inductor can be rapidly reduced to be zero, so as to quickly start a next switching period. However, the forcedly changing the given current peak value (or the on-time period Ton) may result in the waveform of an input current being a non-sinusoidal waveform, and may further result in a severe total harmonic distortion (THD) of the PFC circuit.

In conclusion, problems of the high cost and the severe THD exist in the conventional method for controlling a PFC circuit.

SUMMARY

There are provided a method, an apparatus and a device for controlling a power factor correction PFC circuit, and a medium according to embodiments of the present disclosure, to solve problems of a high cost and a severe THD existing in the conventional method for controlling a PFC circuit.

In a first aspect, a method for controlling a power factor correction PFC circuit is provided according to an embodiment of the present disclosure. The method includes:

acquiring circuit parameter information of the PFC circuit; and switching a control mode of the PFC circuit to a continuous current mode (CCM) if it is determined that the circuit parameter information meets a predetermined switching condition.

In a possible embodiment, in the method provided in the above embodiment of the present disclosure, after switching the control mode of the PFC circuit to the CCM, the method further includes:

switching the control mode of the PFC circuit to a triangular current mode (TCM) or a critical-conduction mode (CRM) if it is determined that the circuit parameter information does not meet the predetermined switching condition.

In a possible embodiment, in the method provided in the above embodiment of the present disclosure, the circuit parameter information includes one or more of voltage information, an operating frequency and a wave generating period.

In a possible embodiment, in the method provided in the above embodiment of the present disclosure, in a case that the circuit parameter information includes the voltage information, the switching a control mode of the PFC circuit to a continuous current mode (CCM) if it is determined that the circuit parameter information meets a predetermined switching condition includes:

determining that the voltage information meets the predetermined switching condition and switching the control mode of the PFC circuit to the continuous current mode (CCM), if the voltage information meets one or more of:

a maximum instantaneous value of an input voltage of the PFC circuit being greater than a preset maximum threshold;

an effective value of the input voltage of the PFC circuit in a set period being greater than a preset effective threshold;

an average of the input voltage of the PFC circuit in a set period being greater than a preset average threshold; and a voltage difference between an output voltage and the input voltage of the PFC circuit being less than a preset difference threshold.

In a possible embodiment, in the method provided in the above embodiment of the present disclosure, in a case that the circuit parameter information includes the operating frequency, the switching a control mode of the PFC circuit to a continuous current mode (CCM) if it is determined that the circuit parameter information meets a predetermined switching condition includes:

determining that the operating frequency of the PFC circuit meets the predetermined switching condition and switching the control mode of the PFC circuit to the continuous current mode (CCM), if the operating frequency of the PFC circuit is less than a preset frequency threshold.

In a possible embodiment, in the method provided in the above embodiment of the present disclosure, in a case that the circuit parameter information includes the wave generating period, the switching a control mode of the PFC circuit to a continuous current mode (CCM) if it is determined that the circuit parameter information meets a predetermined switching condition includes:

determining that the wave generating period of the PFC circuit meets the predetermined switching condition and switching the control mode of the PFC circuit to the continuous current mode (CCM), if the wave generating period of the PFC circuit is greater than a preset time length.

In a second aspect, an apparatus for controlling a power factor correction (PFC) circuit is provided according to an embodiment of the present disclosure. The apparatus includes an acquiring unit and a switching unit. The acquiring unit is configured to acquire circuit parameter information of the PFC circuit. The switching unit is configured to switch a control mode of the PFC circuit to a continuous current mode (CCM) if it is determined that the circuit parameter information meets a predetermined switching condition.

In a possible embodiment, in the apparatus provided in the above embodiment of the present disclosure, the switching unit is further configured to: after switching the control mode of the PFC circuit to the CCM, switch the control mode of the PFC circuit to a triangular current mode (TCM) or a critical-conduction mode (CRM) if it is determined that the circuit parameter information does not meet the predetermined switching condition.

In a possible embodiment, in the apparatus provided in the above embodiment of the present disclosure, the circuit parameter information includes one or more of voltage information, an operating frequency and a wave generating period.

In a possible embodiment, in the apparatus provided in the above embodiment of the present disclosure, in a case that the circuit parameter information includes the voltage information, the switching unit is configured to:

determine that the voltage information meets the predetermined switching condition and switch the control mode of the PFC circuit to the continuous current mode (CCM), if the voltage information meets one or more of:

a maximum instantaneous value of an input voltage of the PFC circuit being greater than a preset maximum threshold;

an effective value of the input voltage of the PFC circuit in a set period being greater than a preset effective threshold;

an average of the input voltage of the PFC circuit in a set period being greater than a preset average threshold; and a voltage difference between an output voltage and the input voltage of the PFC circuit being less than a preset difference threshold.

In a possible embodiment, in the apparatus provided in the above embodiment of the present disclosure, in a case that the circuit parameter information includes the operating frequency, the switching unit is configured to:

determine that the operating frequency of the PFC circuit meets the predetermined switching condition and switch the control mode of the PFC circuit to the continuous current mode (CCM), if the operating frequency of the PFC circuit is less than a preset frequency threshold.

In a possible embodiment, in the apparatus provided in the above embodiment of the present disclosure, in a case that the circuit parameter information includes the wave generating period, the switching unit is configured to:

determine that the wave generating period of the PFC circuit meets the predetermined switching condition and switch the control mode of the PFC circuit to the continuous current mode (CCM), if the wave generating period of the PFC circuit is greater than a preset time length.

In a third aspect, a device for controlling a power factor correction PFC circuit is further provided according to an embodiment of the present disclosure. The device includes a memory and a processor. The memory is configured to store program instructions. The processor is configured to: call the program instructions stored in the memory; and perform, in accordance with the obtained program, the method for controlling a power factor correction PFC circuit provided in the first aspect of the present disclosure.

In a fourth aspect, a computer storage medium is further provided according to an embodiment of the present disclosure. The computer storage medium has stored thereon computer executable instructions that cause a computer to perform the method for controlling a power factor correction (PFC) circuit provided in the first aspect of the present disclosure.

According to technical solutions in the embodiments of the present disclosure, after the circuit parameter information of the PFC circuit is acquired, the control mode of the PFC circuit is switched to the continuous current mode (CCM) if it is determined that the circuit parameter information meets the predetermined switching condition. Compared with the conventional technology, the solution for controlling a PFC circuit provided in the embodiments of the present disclosure may vary according to circuit parameter information, rather than being unchanged. Further, it is not required to improve the voltage-withstand level of a bus capacitor, so that the cost can be reduced. In addition, it is not required to forcedly change the given current peak value (or the on-time period Ton), so that the THD of an input current can be reduced.

Further, according to the technical solutions in the embodiments of the present disclosure, if it is determined that the circuit parameter information meets the predetermined switching condition, the control mode of the PFC circuit is switched to the CCM. In this way, a case when the output voltage of the PFC circuit is approximate to the input voltage of the PFC circuit and the PFC circuit operates in the CRM mode or the TCM mode, that a current flowing through an inductor in the PFC circuit may be not reduced to be zero or may be reduced to be zero (or a fixed negative value) after a long time period elapses, can be avoided, so that the next period can be normally started in the PFC circuit, ensuring the normal operation of the PFC circuit.

Other features and advantages of the present disclosure are illustrated in the following description, a part of which are apparent from the description or may be understood by implementing the present disclosure. Objects and other advantages of the present disclosure can be achieved through structures described in detail in the description, the claims, and the drawings.

DETAILED DESCRIPTION OF EMBODIMENTS

Embodiments of the present disclosure are described below in conjunction with the drawings. It should be understood that the embodiments described herein are used only to illustrate and explain the present disclosure, rather than to limit the present disclosure.

In view of problems of a high cost and a severe THD, existing in the conventional method for controlling a PFC circuit, a solution for controlling a power factor correction (PFC) circuit is provided in the present disclosure. The solution for controlling a PFC circuit provided in the present disclosure may vary according to circuit parameter information, rather than being unchanged. Further, it is not required to improve the voltage-withstand level of a bus capacitor, so that the cost can be reduced. In addition, it is not required to forcedly change the given current peak value (or the on-time period Ton), so that the THD of an input current can be reduced.

It should be noted that the solution for controlling a power factor correction (PFC) circuit provided in the present disclosure may be applied to not only a totem-pole PFC circuit topology, but also a circuit including the totem-pole PFC circuit topology and any variation of the totem-pole PFC circuit topology.

Figure 1:
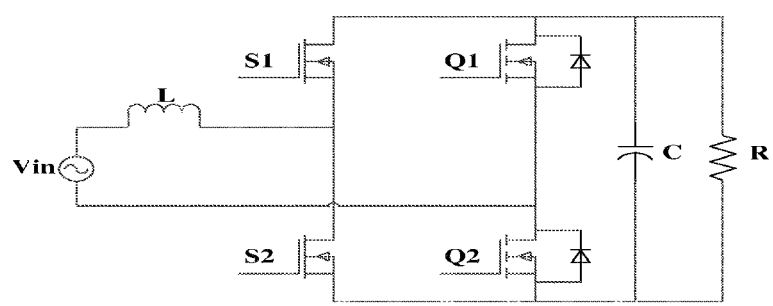
FIG. 1 is a schematic structural diagram showing a circuit topology of a totem-pole PFC circuit according to an embodiment of the present disclosure.

Reference is made to FIG. 1, which shows a PFC circuit according to an embodiment of the present disclosure. The PFC circuit includes a PFC inductor L, a first branch formed by a first high-frequency transistor S1 and a second high-frequency transistor S2 connected in series with each other, and a second branch formed by a first power-frequency transistor Q1 and a second power-frequency transistor Q2 connected in series with each other. The first branch is connected in parallel with the second branch. One terminal of a parallel branch formed by the first branch and the second branch is connected to one terminal of a bus capacitor C and one terminal of a load resistor R, and the other terminal of the parallel branch is connected to the other terminal of the bus capacitor C and the other terminal of the load resistor R.

The high-frequency transistor in the totem-pole PFC circuit is generally implemented by a metal-oxide-semiconductor field-effect transistor (MOSFET) having low reverse recovery performance, for example, a gallium nitride (GaN) transistor. In other embodiments of the present disclosure, the high-frequency transistor may also be implemented by other switch transistors, such as a silicon carbide (SiC) transistor or an insulated gate bipolar transistor (IGBT), as long as the transistor has the low reverse recovery function, which is not limited herein.

Figure 2:
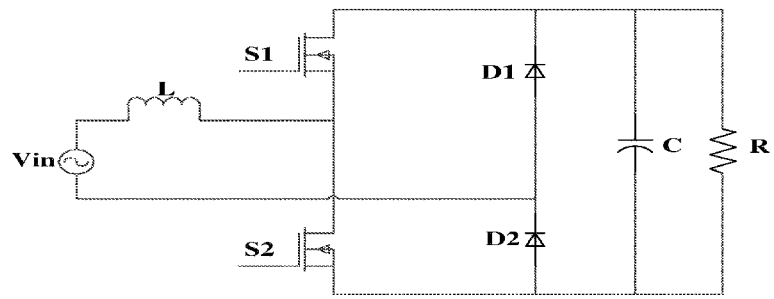
FIG. 2 is a schematic structural diagram showing a circuit topology of a totem-pole PFC circuit according to another embodiment of the present disclosure.

Reference is made to FIG. 2, which shows a PFC circuit according to another embodiment of the present disclosure. This embodiment differs from the embodiment shown in FIG. 1 in that each of the first power-frequency transistor Q1 and the second power-frequency transistor Q2 in the second branch is replaced with a diode, which is shown as a diode D1 and D2 in FIG. 2.

A method, an apparatus, and a device for controlling a power factor correction PFC circuit, and a medium are provided according to embodiments of the present disclosure, which are described in detail below in conjunction with the drawings.

Figure 3:
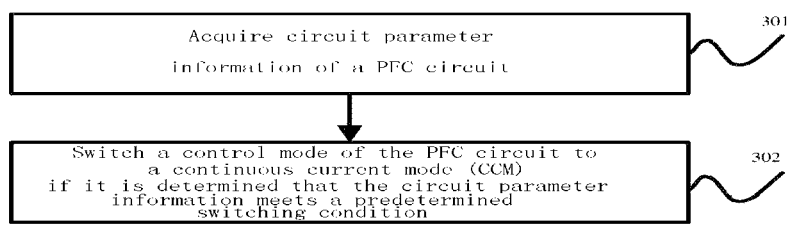
FIG. 3 is a schematic flowchart showing a method for controlling a power factor correction (PFC) circuit according to an embodiment of the present disclosure.

As shown in FIG. 3, a method for controlling a power factor correction (PFC) circuit according to an embodiment of the present disclosure includes the following steps 301 and 302. In step 301, circuit parameter information of the PFC circuit is acquired.

The circuit parameter information is a collective term for parameters of elements in a circuit and parameters of nodes in the circuit. Specifically, the circuit parameter information may include parameters of elements in a circuit, for example, a resistance of a resistor in the circuit, an inductance of an inductor in the circuit, an operating voltage of the inductor, a turn-on voltage of a diode in the circuit, and an operating frequency of a switch transistor in the circuit. The circuit parameter information may also include measurement values of nodes in the circuit, for example, a voltage value and a current value of a node in the circuit, and a voltage difference between two nodes in the circuit.

The circuit parameter information of the PFC circuit in step 301 may include but is not limited to: voltage information, an operating frequency and a wave generating period. The voltage information may include an input voltage, and a voltage difference between an output voltage and the input voltage. In other embodiments of the present disclosure, the circuit parameter information may further include other information, which is not limited herein.

Specifically, the circuit parameter information of the PFC circuit may be acquired by performing a calculation and/or measurement process periodically or in a real-time manner, which is not limited herein.

In step 302, if it is determined that the circuit parameter information meets a predetermined switching condition, a control mode of the PFC circuit is switched to a continuous current mode (CCM).

Specifically, in the CCM controlling manner, even if the voltage difference between the output voltage and the input voltage of the PFC circuit is small, a next switching period can be normally started when a preset switching period arrives. Therefore, if it is determined that the circuit parameter information meets the predetermined switching condition, the control mode of the PFC circuit is switched to the CCM. In this way, a case when the output voltage of the PFC circuit is approximate to the input voltage of the PFC circuit and the PFC circuit operates in the CRM or the TCM, that a current flowing through an inductor in the PFC circuit may be not reduced to be zero or may be reduced to be zero (or a fixed negative value) after a long time period elapses, can be avoided, so that the next period can be normally started in the PFC circuit, ensuring the normal operation of the PFC circuit.

The CCM may be implemented by constant-frequency average current control, variable-frequency and variable-loop-width hysteresis control, variable-frequency and constant-loop-width hysteresis control, or peak current control, which is not limited herein.

Practically, appropriate hysteresis control may be performed during the switching of the control mode, to ensure security and stability of the PFC circuit. Specifically, the control mode may be switched immediately after the predetermined switching condition is met, or may be switched at a predetermined time instant after a certain time period elapses. For example, the control mode may be switched at a zero-crossing time instant of an alternating current voltage, rather than immediately after the predetermined switching condition is met, thereby reducing an impact on the system caused by the switching of the control mode under a large current.

In a possible embodiment, after the control mode of the PFC circuit is switched to the CCM, the control mode of the PFC circuit is switched to the TCM or the CRM if it is determined that the circuit parameter information does not meet the predetermined switching condition, to ensure high efficiency of the PFC circuit.

In other words, the control mode of the PFC circuit is switched to the continuous current mode (CCM) if it is determined that circuit parameter information meets the predetermined switching condition, and the control mode of the PFC circuit is switched to the TCM or the CRM if it is determined that the circuit parameter information does not meet the predetermined switching condition, so that the PFC circuit can operate in the TCM or the CRM to the full extent. When the PFC circuit cannot normally operate in the TCM or the CRM, the control mode of the PFC circuit is switched to the CCM. In this way, the high efficiency can be achieved in the TCM or the CRM, and the normal operation under a high voltage and a relatively small THD can be achieved in the CCM, so that the PFC circuit can have a high efficiency and a relatively small THD under a high voltage and a heavy load.

Hereinafter, the predetermined switching condition in the embodiments of the present disclosure is described in detail by respectively taking the voltage information, the operating frequency and the wave generating period as examples.

In a possible embodiment, the circuit parameter information is the voltage information, and the switching the control mode of the PFC circuit to the CCM if it is determined that the circuit parameter information meets the predetermined switching condition includes: determining that the voltage information meets the predetermined switching condition and switching the control mode of the PFC circuit to the CCM, if the voltage information meets one or more of: a maximum instantaneous value of an input voltage of the PFC circuit being greater than a preset maximum threshold; an effective value of the input voltage of the PFC circuit in a set period being greater than a preset effective threshold; an average of the input voltage of the PFC circuit in a set period being greater than a preset average threshold; and a voltage difference between an output voltage and the input voltage of the PFC circuit being less than a preset difference threshold.

In the case of comparing the maximum instantaneous value of the input voltage of the PFC circuit with a preset maximum threshold, the preset maximum threshold may be flexibly set according to actual situations. The preset maximum threshold may be set as, for example, 380V or 390V, as long as actual demands can be met, which is not limited herein.

In an example, it is assumed that the preset maximum threshold is set as 380V. If the maximum instantaneous value of the input voltage is 400V, it is determined that the voltage information meets the predetermined switching condition. In this case, the control mode of the PFC circuit is switched to the CCM.

In another example, it is assumed that the preset maximum threshold is set as 380V. If the maximum instantaneous value of the input voltage is 360V, it is determined that the voltage information does not meet the predetermined switching condition. In this case, the control mode of the PFC circuit is switched to the CRM or the TCM.

In the case of comparing the effective value of the input voltage of the PFC circuit in a set period (T1) with a preset effective threshold, the set period (T1) may be flexibly set according to actual situations. The set period (T1) may be set as, for example, 1 h (hour), 1 min (minute) or 1 s (second), which is not limited herein.

It should be noted that the preset effective threshold may be flexibly set according to the actual situations. The preset effective threshold may be set as, for example, 270V or 290V, as long as the actual demands can be met, which is not limited herein.

In an example, it is assumed that the preset effective threshold is set as 270V. If the effective value of the input voltage is 300V, it is determined that the voltage information meets the predetermined switching condition. In this case, the control mode of the PFC circuit is switched to the CCM.

In another example, it is assumed that the preset effective threshold is 270V. If the effective value of the input voltage is 250V, it is determined that the voltage information does not meet the predetermined switching condition. In this case, the control mode of the PFC circuit is switched to the CRM or the TCM.

In the case of comparing the average of the input voltage of the PFC circuit in a set period (T2) with a preset average threshold, the set period (T2) may be flexibly set according to actual situations. The set period (T2) may be set as, for example, 1 h (hour), 1 min (minute) or 1 s (second). The set period (T2) may be set to be the same as or different from the set period (T1), which is not limited herein.

It should be noted that the preset average threshold may be flexibly set according to the actual situations. The preset average threshold may be set as, for example, 250V or 270V, as long as the actual demands can be met, which is not limited herein.

In an example, it is assumed that the preset average threshold is set as 250V. If the average of the input voltage is 270V, it is determined that the voltage information meets the predetermined switching condition. In this case, the control mode of the PFC circuit is switched to the CCM.

In another example, it is assumed that the preset average threshold is 250V. If the average of the input voltage is 230V, it is determined that the voltage information does not meet the predetermined switching condition. In this case, the control mode of the PFC circuit is switched to the CRM or the TCM.

In the case of comparing the voltage difference between the output voltage and the input voltage of the PFC circuit with a preset difference threshold, the voltage difference between the output voltage and the input voltage of the PFC circuit may usually be represented by an instantaneous value of a voltage difference $\Delta V$ between the output voltage and the input voltage of the PFC circuit.

The preset difference threshold may be flexibly set according to actual situations. The preset difference threshold may be set as, for example, 10V or 20V, as long as actual demands can be met, which is not limited herein.

In an example, it is assumed that the preset difference threshold is set as 30V. If an input voltage Vin is 400V and an output voltage Vout is 420V, i.e., the voltage difference between the output voltage and the input voltage is 20V, it is determined that the voltage information meets the predetermined switching condition. In this case, the control mode of the PFC circuit is switched to the CCM.

In another example, it is assumed that the preset difference threshold is set as 30V. If an input voltage Vin is 380V and an output voltage Vout is 420V, i.e., the voltage difference between the output voltage and the input voltage is 40V, it is determined that the voltage information does not meet the predetermined switching condition. In this case, the control mode of the PFC circuit is switched to the CRM or the TCM.

In a possible embodiment, the circuit parameter information is the operating frequency, and the switching the control mode of the PFC circuit to the CCM if it is determined that the circuit parameter information meets the predetermined switching condition includes: determining that the operating frequency of the PFC circuit meets the predetermined switching condition and switching the control mode of the PFC circuit to the CCM, if the operating frequency of the PFC circuit is less than a preset frequency threshold.

The preset frequency threshold may be flexibly set according to actual situations. The preset frequency threshold may be set as, for example, 15 KHz or 20 KHz, as long as actual demands can be met, which is not limited herein.

In an example, it is assumed that the preset frequency threshold is set as 20 KHz. If a current operating frequency of the PFC circuit is 15 KHz, it is determined that the operating frequency meets the predetermined switching condition. In this case, the control mode of the PFC circuit is switched to the CCM.

In another example, it is assumed that the preset frequency threshold is 20 KHz. If a current operating frequency of the PFC circuit is 25 KHz, it is determined that the operating frequency does not meet the predetermined switching condition. In this case, the control mode of the PFC circuit is switched to the CRM or the TCM.

In a possible embodiment, the circuit parameter information is the wave generating period, and the switching the control mode of the PFC circuit to the CCM if it is determined that the circuit parameter information meets the predetermined switching condition includes: determining that the wave generating period of the PFC circuit meets the predetermined switching condition and switching the control mode of the PFC circuit to the CCM, if the wave generating period of the PFC circuit is greater than a preset time length.

The preset time length may be flexibly set according to actual situations. The preset time length may be set as, for example, 50 μs or 60 μs, as long as actual demands can be met, which is not limited herein.

In an example, it is assumed that the preset time length is set as 50 μs. If a current wave generating period of the PFC circuit is 60 μs, it is determined that the wave generating period meets the predetermined switching condition. In this case, the control mode of the PFC circuit is switched to the CCM.

In an example, it is assumed that the preset time length is set as 50 μs. If a current wave generating period of the PFC circuit is 40 μs, it is determined that the wave generating period does not meet the predetermined switching condition. In this case, the control mode of the PFC circuit is switched to the CRM or the TCM.

Based on the same inventive concept as the above method, an apparatus for controlling a power factor correction PFC circuit is further provided according to an embodiment of the present disclosure.

Figure 4:
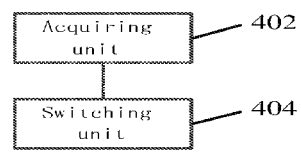
FIG. 4 is a schematic structural diagram showing an apparatus for controlling a power factor correction (PFC) circuit according to an embodiment of the present disclosure.

Referring to FIG. 4, the apparatus for controlling a power factor correction PFC circuit according to the embodiment of the present disclosure includes an acquiring unit 402 and a switching unit 404. The acquiring unit 402 is configured to acquire circuit parameter information of the PFC circuit. The switching unit 404 is configured to: switch a control mode of the PFC circuit to a continuous current mode (CCM) if it is determined that the circuit parameter information meets a predetermined switching condition.

With the apparatus for controlling a power factor correction PFC circuit according to the embodiment of the present disclosure, after the circuit parameter information of the PFC circuit is acquired, the control mode of the PFC circuit is switched to the continuous current mode (CCM) if it is determined that the circuit parameter information meets the predetermined switching condition, and the control mode of the PFC circuit is switched to a triangular current mode (TCM) or a critical-conduction mode (CRM) if it is determined that the circuit parameter information does not meet the predetermined switching condition. Compared with the conventional technology, the solution for controlling a PFC circuit provided in the embodiment of the present disclosure may vary according to circuit parameter information, rather than being unchanged. Further, it is not required to improve the voltage-withstand level of a bus capacitor, so that the cost can be reduced. In addition, it is not required to forcedly change the given current peak value (or the on-time period Ton), so that the THD of an input current can be reduced.

Further, with the apparatus for controlling a power factor correction PFC circuit according to the embodiment of the present disclosure, if it is determined that the circuit parameter information meets the predetermined switching condition, the control mode of the PFC circuit is switched to the CCM. In this way, a case when the output voltage of the PFC circuit is approximate to the input voltage of the PFC circuit and the PFC circuit operates in the CRM or the TCM, that a current flowing through an inductor in the PFC circuit may be not reduced to be zero or may be reduced to be zero (or a fixed negative value) after a long time period elapses, can be avoided, so that the next period can be normally started in the PFC circuit, ensuring the normal operation of the PFC circuit.

In a possible embodiment, the switching unit 404 is further configured to: after switching the control mode of the PFC circuit to the CCM, switch the control mode of the PFC circuit to a triangular current mode (TCM) or a critical-conduction mode (CRM) if it is determined that the circuit parameter information does not meet the predetermined switching condition.

With the apparatus for controlling a power factor correction PFC circuit according to the embodiment of the present disclosure, the control mode of the PFC circuit is switched to the continuous current mode (CCM) if it is determined that circuit parameter information meets the predetermined switching condition, and the control mode of the PFC circuit is switched to the TCM or the CRM if it is determined that the circuit parameter information does not meet the predetermined switching condition, so that the PFC circuit can operate in the TCM or the CRM to the full extent. When the PFC circuit cannot normally operate in the TCM or the CRM, the control mode of the PFC circuit is switched to the CCM. In this way, the high efficiency can be achieved in the TCM or the CRM, and the normal operation under a high voltage and a relatively small THD can be achieved in the CCM, so that the PFC circuit can have a high efficiency and a relatively small THD under a high voltage and a heavy load.

In a possible embodiment, the circuit parameter information includes one or more of voltage information, an operating frequency and a wave generating period.

In a possible embodiment, the circuit parameter information includes the voltage information, and the switching unit 404 is configured to: determine that the voltage information meets the predetermined switching condition and switch the control mode of the PFC circuit to the continuous current mode (CCM), if the voltage information meets one or more of: a maximum instantaneous value of an input voltage of the PFC circuit being greater than a preset maximum threshold; an effective value of the input voltage of the PFC circuit in a set period being greater than a preset effective threshold; an average of the input voltage of the PFC circuit in a set period being greater than a preset average threshold; and a voltage difference between an output voltage and the input voltage of the PFC circuit being less than a preset difference threshold.

In a possible embodiment, the circuit parameter information includes the operating frequency, and the switching unit 404 is configured to: determine that the operating frequency of the PFC circuit meets the predetermined switching condition and switch the control mode of the PFC circuit to the continuous current mode (CCM), if the operating frequency of the PFC circuit is less than a preset frequency threshold.

In a possible embodiment, the circuit parameter information includes the wave generating period, and the switching unit 404 is configured to: determine that the wave generating period of the PFC circuit meets the predetermined switching condition and switch the control mode of the PFC circuit to the continuous current mode (CCM), if the wave generating period of the PFC circuit is greater than a preset time length.

Figure 5:
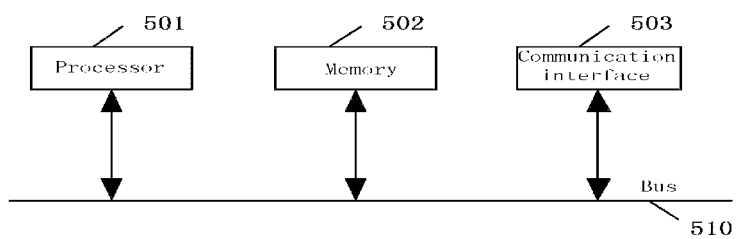
FIG. 5 is a schematic structural diagram showing a device for controlling a power factor correction (PFC) circuit according to an embodiment of the present disclosure.

Further, the method and the apparatus for controlling a power factor correction PFC circuit described with reference to FIGS. 1 to 4 may be implemented by a device for controlling a power factor correction PFC circuit. FIG. 5 is a schematic structural diagram showing a hardware configuration of a device for controlling a power factor correction PFC circuit according to an embodiment of the present disclosure.

The device for controlling a power factor correction PFC circuit may include a processor 501, and a memory 502 storing computer program instructions.

Specifically, the processor 501 may include a central processing unit (CPU) or an application specific integrated circuit (ASIC). Alternatively, the processor 501 may be configured as one or more integrated circuits for implementing the embodiments of the present disclosure.

The memory 502 may include a mass memory for data or instructions. The memory 502 may include but is not limited to: a hard disk drive (HDD), a floppy disk driver, a flash memory, an optical disk, a magneto-optic disk, a tape, a universal serial bus (USB) driver, or a combination of two or more of the above. The memory 502 may include a removable or non-removable (or fixed) medium, where appropriate. The memory 502 may be arranged inside or outside a data processing device, where appropriate. In a specific embodiment, the memory 502 is a non-volatile solid-state memory. In a specific embodiment, the memory 502 includes a read-only memory (ROM). The ROM may be a mask-programmed ROM, a programmable ROM (PROM), an erasable PROM (EPROM), an electrically erasable PROM (EEPROM), an electrically alterable ROM (EAROM), a flash memory, or a combination of two or more of the above, where appropriate.

The processor 501 reads and executes the computer program instructions stored in the memory 502, to perform the method for controlling a power factor correction PFC circuit described in any one of the above embodiments.

In an example, the device for controlling a power factor correction PFC circuit may further include a communication interface 503, and a bus 510. As shown in FIG. 5, the processor 501, the memory 502, and the communication interface 503 are connected to each other via the bus 510 and are in communication with each other.

The communication interface 503 is mainly used to implement communications between modules, apparatuses, units and/or devices in the embodiments of the present disclosure.

The bus 510 may be implemented by hardware, software or a combination of the hardware and software, by which components in the device for controlling a power factor correction PFC circuit are coupled with each other. The bus may include but is not limited to: an accelerated graphics port (AGP) or other graphics buses, an enhanced industry standard architecture (EISA) bus, a front-side bus (FSB), a hyper transport (HT) interconnect bus, an industry standard architecture (ISA) bus, a wireless bandwidth interconnect bus, a low pin count (LPC) bus, a storage bus, a microchannel architecture (MCA) bus, a peripheral component interconnect (PCI) bus, a PCI-Express (PCI-X) bus, a serial advanced technology attachment (SATA) bus, a video electronics standards association local bus (VLB), other appropriate buses, or a combination of two or more of the above. The bus 510 may include one or more buses, where appropriate. Although specific buses are described and shown in the present disclosure, any appropriate bus or interconnect is applicable in the present disclosure.

The device for controlling a power factor correction PFC circuit may perform, based on the acquired circuit parameter information of the PFC circuit, the method for controlling a power factor correction PFC circuit described in the embodiments of the present disclosure, to implement the method and the apparatus for controlling a power factor correction PFC circuit described with reference to FIGS. 1 to 4.

Further, based on the method for controlling a power factor correction PFC circuit described in the above embodiments of the present disclosure, a computer readable storage medium is provided according to an embodiment of the present disclosure. The computer readable medium has stored thereon computer program instructions. The computer program instructions, when executed by a processor, cause the processor to perform the method for controlling a power factor correction PFC circuit described in any one of the embodiments of the present disclosure.

It should be understood by those skilled in the art that the embodiments of the present disclosure may be implemented as methods, systems or computer program products. Therefore, the present disclosure may be implemented by only hardware embodiments, only software embodiments or embodiments combining software with hardware. Alternatively, the present disclosure may be implemented as computer program products implemented on one or more computer available storage mediums (including but not limited to a magnetic disk memory, CD-ROM and an optical memory or the like) including computer available program codes.

The present disclosure is described with reference to flowcharts and/or block diagrams of the methods, devices (systems) and computer program products according to the present disclosure. It should be understood that, each flow and/or block in the flowcharts and/or block diagrams and a combination of flows and/or blocks in the flowcharts and/or block diagrams may be implemented by computer program instructions. The computer program instructions may be provided to a general-purpose computer, a dedicated computer, an embedded processor or processors of other programmable data processing devices to generate a machine, so that the instructions executed by the computer or the processors of the other programmable data processing devices generate a device for implementing functions specified in one or more flows of the flowcharts and/or one or more blocks of the block diagrams.

The computer program instructions may also be stored in a computer readable memory which can guide the computer or other programmable data processing devices to operate in a certain manner, so that the instructions stored in the computer readable memory generate a product including an instruction device which implements functions specified in one or more flows of the flowcharts and/or one or more blocks of the block diagrams.

The computer program instructions may also be loaded to the computer or other programmable data processing devices, so that the computer or other programmable devices perform a series of operation steps to generate processing implemented by the computer, and thus the instructions executed on the computer or other programmable devices provide steps for implementing the functions specified in one or more flows of the flowcharts and/or one or more blocks of the block diagrams.

Apparently, those skilled in the art may make various changes and variations to the present disclosure without departing from the spirit and scope of the present disclosure. In this case, if the changes and variations of the present disclosure fall within the scope of the claims of the present disclosure and equivalent technologies thereof, the present disclosure is intended to include the changes and variations.

The invention claimed is:

1. A method for controlling a power factor correction (PFC) circuit, comprising:
    acquiring circuit parameter information of the PFC circuit; and
    switching a control mode of the PFC circuit to a continuous current mode (CCM) immediately if it is determined that the circuit parameter information meets a predetermined switching condition,
    wherein the circuit parameter information comprises one or more of voltage information, an operating frequency and a wave generating period.

2. The method according to claim 1, wherein after switching the control mode of the PFC circuit to the CCM, the method further comprises:
    switching the control mode of the PFC circuit to a triangular current mode (TCM) or a critical-conduction mode (CRM) immediately if it is determined that the circuit parameter information does not meet the predetermined switching condition.

3. The method according to claim 1, wherein in a case that the circuit parameter information comprises the voltage information, the switching the control mode of the PFC circuit to the continuous current mode (CCM) immediately if it is determined that the circuit parameter information meets the predetermined switching condition comprises:
    determining that the voltage information meets the predetermined switching condition and switching the control mode of the PFC circuit to the continuous current mode (CCM), if the voltage information meets one or more of:
        a maximum instantaneous value of an input voltage of the PFC circuit being greater than a preset maximum threshold;
        an effective value of the input voltage of the PFC circuit in a set period being greater than a preset effective threshold;
        an average of the input voltage of the PFC circuit in a set period being greater than a preset average threshold; and
        a voltage difference between an output voltage and the input voltage of the PFC circuit being less than a preset difference threshold.

4. The method according to claim 1, wherein in a case that the circuit parameter information comprises the operating frequency, the switching the the control mode of the PFC circuit to the continuous current mode (CCM) immediately if immediately it is determined that the circuit parameter information meets the predetermined switching condition comprises:
    determining that the operating frequency of the PFC circuit meets the predetermined switching condition and switching the control mode of the PFC circuit to the continuous current mode (CCM), if the operating frequency of the PFC circuit is less than a preset frequency threshold.

5. The method according to claim 1, wherein in a case that the circuit parameter information comprises the wave generating period, the switching the control mode of the PFC circuit to the continuous current mode (CCM) immediately if it is determined that the circuit parameter information meets the predetermined switching condition comprises:
    determining that the wave generating period of the PFC circuit meets the predetermined switching condition and switching the control mode of the PFC circuit to the continuous current mode (CCM), if the wave generating period of the PFC circuit is greater than a preset time length.

6. An apparatus for controlling a power factor correction (PFC) circuit, the apparatus comprising:
    an acquiring unit configured to acquire circuit parameter information of the PFC circuit; and
    a switching unit configured to: switch a control mode of the PFC circuit to a continuous current mode (CCM) immediately if it is determined that the circuit parameter information meets a predetermined switching condition,
    wherein the circuit parameter information comprises one or more of voltage information, an operating frequency and a wave generating period.

7. The apparatus according to claim 6, wherein the switching unit is further configured to: after switching the control mode of the PFC circuit to the CCM, switch the control mode of the PFC circuit to a triangular current mode (TCM) or a critical-conduction mode (CRM) immediately if it is determined that the circuit parameter information does not meet the predetermined switching condition.

8. The apparatus according to claim 6, wherein in a case that the circuit parameter information comprises the voltage information, the switching unit is configured to:
    determine that the voltage information meets the predetermined switching condition and switch the control mode of the PFC circuit to the continuous current mode (CCM) immediately, if the voltage information meets one or more of:
        a maximum instantaneous value of an input voltage of the PFC circuit being greater than a preset maximum threshold;
        an effective value of the input voltage of the PFC circuit in a set period being greater than a preset effective threshold;
        an average of the input voltage of the PFC circuit in a set period being greater than a preset average threshold; and
        a voltage difference between an output voltage and the input voltage of the PFC circuit being less than a preset difference threshold.

9. The apparatus according to claim 6, wherein in a case that the circuit parameter information comprises the operating frequency, the switching unit is configured to:
  determine that the operating frequency of the PFC circuit meets the predetermined switching condition and switch the control mode of the PFC circuit to the continuous current mode (CCM) immediately, if the operating frequency of the PFC circuit is less than a preset frequency threshold.

10. The apparatus according to claim 6, wherein in a case that the circuit parameter information comprises the wave generating period, the switching unit is configured to:
  determine that the wave generating period of the PFC circuit meets the predetermined switching condition and switch the control mode of the PFC circuit to the continuous current mode (CCM) immediately, if the wave generating period of the PFC circuit is greater than a preset time length.

11. A device for controlling a power factor correction (PFC) circuit, the device comprising:
  a memory configured to store program instructions; and
  a processor configured to:
    obtain the program instructions stored in the memory; and
    perform, in accordance with the obtained program instructions, a method for controlling a power factor correction (PFC) circuit comprising:
      acquiring circuit parameter information of the PFC circuit; and
      switching a control mode of the PFC circuit to a continuous current mode (CCM) immediately if it is determined that the circuit parameter information meets a predetermined switching condition,
    wherein the circuit parameter information comprises one or more of voltage information, an operating frequency and a wave generating period.

12. A computer storage medium having stored thereon computer executable instructions that cause a computer to perform a method for controlling a power factor correction (PFC) circuit comprising:
  acquiring circuit parameter information of the PFC circuit; and
  switching a control mode of the PFC circuit to a continuous current mode (CCM) immediately if it is determined that the circuit parameter information meets a predetermined switching condition,
  wherein the circuit parameter information comprises one or more of voltage information, an operating frequency and a wave generating period.

* * * * *